F. C. JOHNSON.
INDEXED SHIPPING BOOK.
No. 11,004. Reissued May 21, 1889.
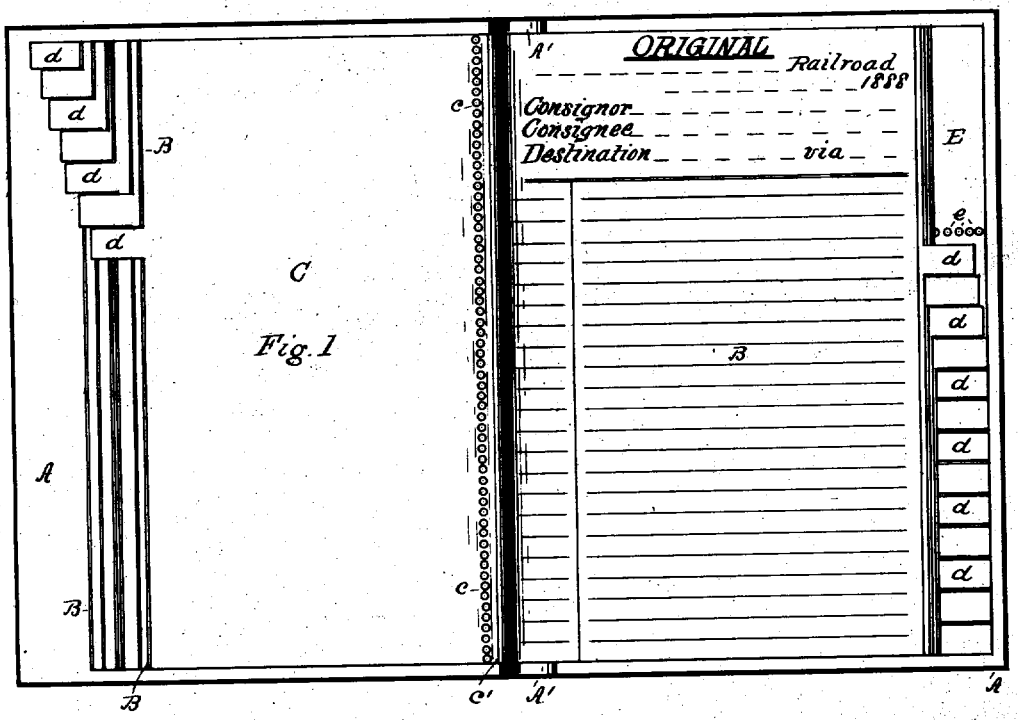
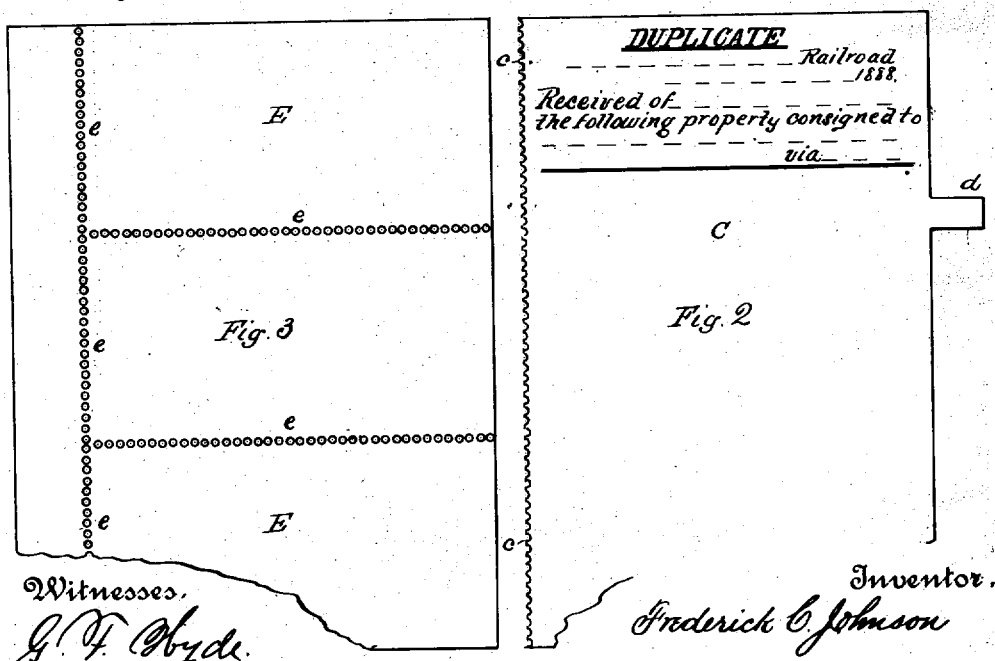
Witnesses.
G. F. Hyde.
C. C. Burchell
Inventor.
Frederick C. Johnson
By his Attorney
P. H. Gunckel.

UNITED STATES PATENT OFFICE.

FREDERICK C. JOHNSON, OF MINNEAPOLIS, MINNESOTA.

INDEXED SHIPPING-BOOK.

SPECIFICATION forming part of Reissued Letters Patent No. 11,004, dated May 21, 1889.

Original No. 394,576, dated December 18, 1888. Application for reissue filed February 2, 1889. Serial No. 298,494.

*To all whom it may concern:*

Be it known that I, FREDERICK C. JOHNSON, a citizen of the United States, residing at Minneapolis, in the county of Hennepin and State of Minnesota, have invented certain new and useful Improvements in Indexed Shipping-Books; and I do hereby declare that the following is a full, clear, and exact description of the same, reference being had to the accompanying drawings.

The object of my invention is the construction of shipping-books with a convenient arrangement of original and duplicate sheets provided with index-tags to facilitate the checking of articles for shipment; and the invention consists, stated generally, in a shipping-book composed of original and duplicate shipping-lists provided with index-tags arranged in series, and also in combining with the same detachable blanks interposed between and separating the sheets and tags of the several series.

In the accompanying drawings, Figure 1 is a plan view of an open shipping-book containing my improvements. Fig. 2 shows one of the duplicate leaves detached, and Fig. 3 a detail view of one of the blanks for separating the sets of lists and tags.

In said drawings, A A′ designate, respectively, the sides and back of the book.

B B designate permanent sheets suitably lettered and spaced to adapt them for use as original shipping-lists.

C C are detachable sheets secured in the book in alternation with the sheets B, and suitably lettered to adapt them for use as duplicates of the lists made on the sheets B. The lists may be imprinted on the duplicate sheets by the interposition of carbon paper between the two sheets in the usual way while the original entries are being made. The sheets C are rendered detachable by means of the perforations *c* on lines near to and parallel with the back A′, and when removed leave stubs *c′*. Each of the sheets C is provided with a tag, *d*, at its margin, suitable for indexing with the name or initial of the consignee of the goods, and the tags are so arranged that all of a series or set will be exposed to view when the book is opened. In this way any desired list of a series can be readily referred to by taking hold of the appropriate tag and opening the book at that place.

The leaves B and C may be of equal size, but should be of less width than the book sides A, and the tags *d* may project beyond the leaves nearly to the margin of the sides A. The book may have any convenient number of leaves provided with the tags *d*, arranged in series along their outer edges, each of the tags of each series being separated from the corresponding tag of the next underlying series by the thickness of the intervening leaves, and such separation being sufficient to permit any tag to be taken hold of without disturbing the underlying tag. To avoid the possibility of tags of any two series being taken hold of at the same time, the leaves E, of a width sufficient to cover the tags, may be interposed between the several series. The sheets E have lengthwise and transverse rows of perforations *e*, to enable the sheets or portions of them to be torn out to expose the tags or a part of the tags of the next underlying series when the checking of one list or a portion of it has been completed and the duplicates detached.

Having described my invention, what I claim, and desire to secure by Letters Patent, is—

1. The combination, with a book having permanent and detachable leaves in alternation, of projecting index-tags provided on the one set of leaves and arranged in separate series, substantially as set forth.

2. In a book, the combination, with the leaves having projecting index-tags arranged in series, of detachable leaves at intervals covering the tags and separating the several series, substantially as set forth.

3. In a shipping-book, the combination, with the permanent leaves and the detachable leaves having projecting index-tags arranged in series along the margins, of the interposed leaves covering the tags and dividing them into sets and provided with perforations for detaching them, substantially as set forth.

FREDERICK C. JOHNSON.

Witnesses:

GEORGE E. LE CLAIR,

P. H. GUNCKEL.